United States Patent [19]
Juergens

[11] 3,883,237
[45] May 13, 1975

[54] PANORAMIC IMAGE REPRODUCING APPARATUS

[75] Inventor: Tristan D. Juergens, Milwaukee, Wis.

[73] Assignee: The Gates Rubber Company, Denver, Colo.

[22] Filed: Aug. 3, 1972

[21] Appl. No.: 277,623

[52] U.S. Cl. .................... 353/10; 353/122
[51] Int. Cl. .......................... G03b 21/00
[58] Field of Search .................. 353/6–10, 38, 353/122; 350/144; 352/86

[56] References Cited
UNITED STATES PATENTS

| | | | |
|---|---|---|---|
| 1,802,099 | 4/1931 | Wolfe | 353/69 |
| 2,530,531 | 11/1950 | McClellan | 353/9 |
| 2,576,147 | 11/1951 | Sauvage | 350/144 |
| 3,292,491 | 12/1966 | Hourdiaux | 353/70 |

FOREIGN PATENTS OR APPLICATIONS

| | | | |
|---|---|---|---|
| 242,881 | 11/1946 | Switzerland | 350/144 |
| 343,319 | 10/1904 | France | 350/144 |

*Primary Examiner*—Richard E. Aegerter
*Assistant Examiner*—A. J. Mirabito
*Attorney, Agent, or Firm*—H. W. Oberg, Jr.; Raymond Fink; Curtis H. Castleman, Jr.

[57] ABSTRACT

A transparency slide projector includes a receiving slot with a diffusion screen adjacent to the slot and a curved illuminator behind the diffusion screen. A special lens for producing pin cushion distortion is mounted to the forward or viewing side of the transparency and in a movable viewing tube permit focusing. A spherical lens creates a pin cushion distorted image having a pleasing three-dimensional effect. A motion picture type projector has the lens placed at the focal distance with respect to the projected film. The image is projected upon a spherically curved screen such that the interaction between the curved screen and the pin cushion distorted image results in a three-dimensional effect.

6 Claims, 4 Drawing Figures

PANORAMIC IMAGE REPRODUCING APPARATUS

BACKGROUND OF THE INVENTION

This invention relates to panoramic image producing apparatus and, particularly, to apparatus for producing of an image with a three-dimensional type of presentation.

Photographic images which are recorded on a suitable supporting medium such as a transparent or opaque base generally present a single dimensional effect when viewed. Special photographic systems have been developed to record images in a special manner such that the reproduction creates a three-dimensional effect. Thus, transparency slides can be taken with a special camera to in essence view an object from two points such as the actual viewing by the two eyes of an observer. The slides are then similarly reproduced in a special viewer and produce a three-dimensional effect. Similarly in film reproduction systems, the image recorded on the film may be distorted and then reproduced with special expanding magnification systems to create a three-dimensional or panoramic effect. Although such systems have been produced, they have a somewhat limited market because of the complexity and special equipment required for taking of the initial image picture as well as reproducing of the image.

SUMMARY OF THE PRESENT INVENTION

The present invention is particularly directed to a relatively simple and inexpensive reproducing system which will create a highly effective three-dimensional or panoramic presentation of a conventional single-dimensional object element. Generally, in accordance with the present invention, a lens means is interposed in front of the element carrying the object with the lens especially constructed to produce pin-cushion-type distortion, for example, a single or multiple element spherical lens means. Thus the magnification is greater at the periphery of the field than at the center and when interposed into the optical reproducing system creates a curved field which applicant has found can transduce flat object elements into a highly realistic three-dimensional presentation. In accordance with the teaching of the present invention, the eye of the observer of a slide-type projector is located inside the focal length or distance of the lens and the insert or object element is located at the focal length or distance. The lens acts as a field stop element producing and maintaining pincushion distortion of the image as viewed by the observer. Applicant has found in the transmission and viewing of objects, such as transparencies or opaque prints, of a conventional single-dimension variety, very realistic and pleasing three-dimensional presentation is made. The images are essentially reproduced with an angle corresponding to the original, or somewhat larger, angle of the observer, and, thereby, create a very life-sized image. The image is thus viewed with the same or a slightly larger angle at the viewer's eye than presented by the original scene to the camera.

A highly satisfactory viewer for the conventional transparency slides includes a receiving slot with a diffusion screen adjacent to the slot and a curved illuminator behind the diffusion screen. The special lens for producing pincushion distortion is mounted to the forward or viewing side of the transparency, and is preferably mounted in a viewing tube member or the like to permit focusing. The observer then places the viewer up to his eye and particularly the entrance end of the tube member and moves the focus element until the picture comes into sharp focus. Applicant has found that the transparency, even though a single-dimensional print, appears as an upright image which is correct from left to right and which accurately reproduces the illustration but in a three-dimensional or panoramic configuration.

The same concept can obviously be applied to an opaque print with the transmitted light being merely changed to reflected light.

The invention can also be applied to a suitable slide or camera projector employing a conventional single-dimension film. Thus the lens can be placed at the focal distance with respect to the projected film, with the image being projected upon a generally spherically curved screen such that the interaction between the curved screen and the pincushion distortion will result in a focused image with a three-dimensional effect.

This invention thus provides a very simple and inexpensive means for viewing of pictures and the like with a highly improved presentation and effect.

BRIEF DESCRIPTION OF DRAWING

The drawing illustrates the best mode presently contemplated of carrying out the invention.

In the drawing.

DESCRIPTION OF ILLUSTRATED EMBODIMENT OF THE INVENTION

Figure 1:
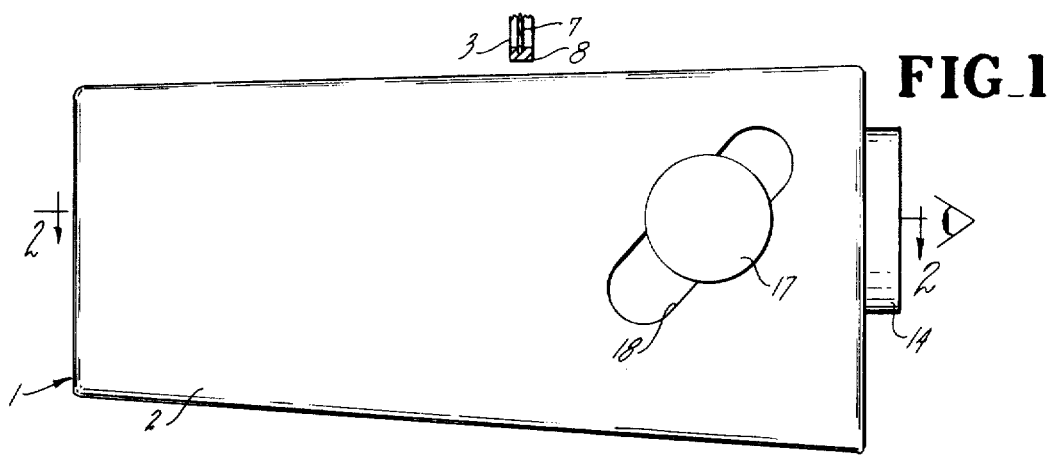
FIG. 1 is a side elevational view of a slide projector constructed in accordance with the teaching of the present invention.
Figure 2:
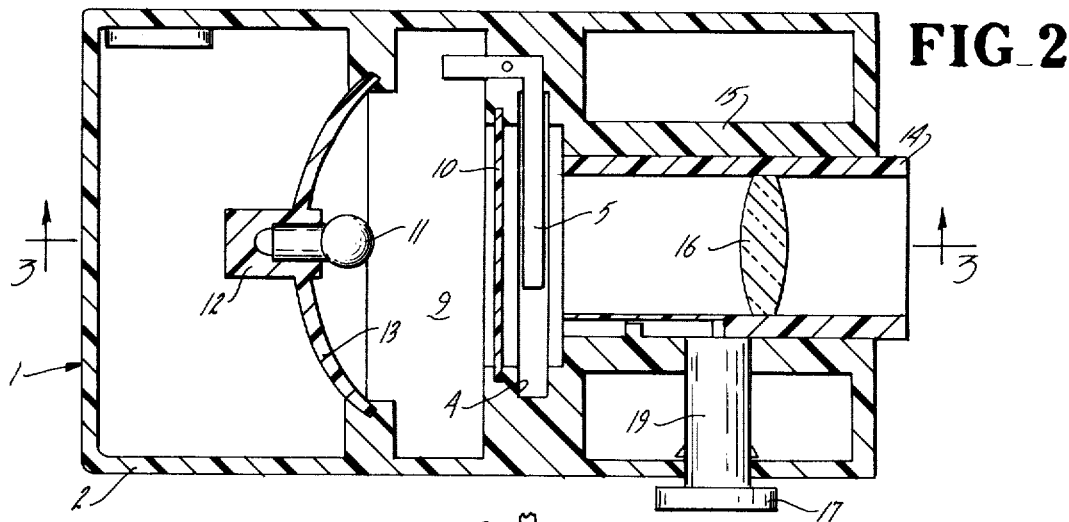
FIG. 2 is a vertical section taken generally on line 2—2 of FIG. 1.
Figure 3:
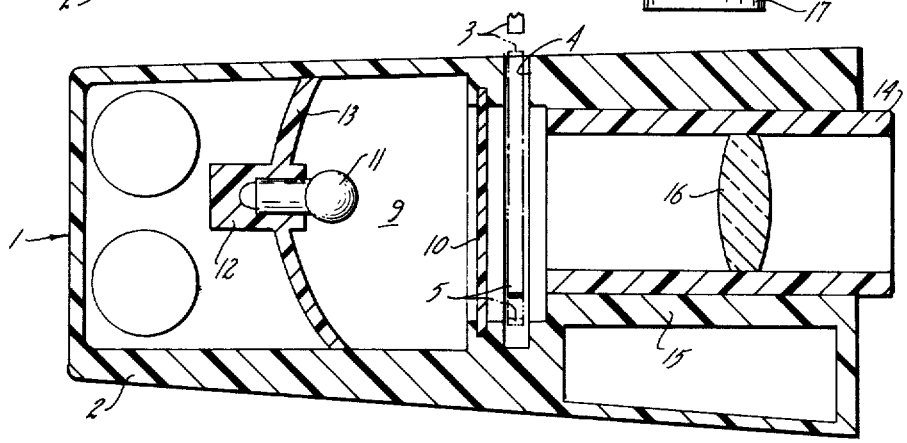
FIG. 3 is a horizontal section taken generally on line 3—3 of FIG. 2.

Referring to the drawing and particularly to FIG. 1, the present invention is shown applied to a transparency slide viewer 1 constructed in accordance with the present invention and having an outer housing 2 adapted to receive a transparency slide 3. The viewer 1 includes a generally centrally located slide slot 4 adapted to receive the individual slide 3 with the base of the slide slot provided with a spring loaded control switch 5 for actuating the viewer 1 to illuminate and present the transparency. Thus, the slide 3 may be a conventional 35 mm. transparency element having a carrying transparency portion 7 mounted within an encircling frame 8. The image is viewed by illuminating the transparency portion 7 generally from the backside while viewing the image from the front side. An illuminating chamber 9 is provided immediately behind the transparency slot 4 with the chamber 9 closed by a diffusion screen 10 adjacent the slide slot 4 to disperse the light and provide a uniform illumination of the portion 7. In the illustrated embodiment of the invention, a conventional incandescent lamp 11 is releasably mounted in a suitable power connecting socket 12 within the illumination chamber 9. A generally spherically curved illuminator 13 defines the back wall of the chamber 9 with operating battery means 13a or the like housed behind the wall.

When the slide 3 is manually depressed into the insertion slot 4, the switch 5 will close and turn on the lamp 11 to thereby provide the uniform illumination to backside of the slide.

This is, of course, a more or less conventional construction.

A viewing member 14 is provided which is aligned with the eye of the observer for purposes of viewing the image of the transparency portion 7. The viewing member 14 is of a relatively substantial length and is preferably adjustably slidably mounted within a holder 15 forming a part of the outer housing 2 of the viewer. In accordance with the present invention, a substantially spherical lens 16, shown as a single lens, is secured in fixed relation within the viewing member 14. The lens 16 is particularly located to position the lens with respect to the viewing end of member 14 such that the eye of the observer will lie within the focal length or distance of the lens. The slide slot 4 is located to position the slide essentially at the focal distance of the lens 16.

The result of this interrelationship is to present a distinct and intended pincushion distorted image of the transparency portion 7 such that the magnification is significantly greater at the periphery of the field than at the center. In essence this creates a curved field which applicant has found produces an optical effect generating an apparent transduction of the flat object into three-dimensional appearance. Applicant has applied the device with a conventional 35 mm. film slide and has found that the three-dimensional effect is obtained whether the pictures are taken with a conventional wide angle lens, a normal or telephoto lens or other conventional camera. Further, the dimensional effect is obtained for both color and black and white films and in essence independent of the equipment and the subject matter. The images appear very life-sized and with at least the original angle of the camera.

A slide knob 17 is mounted within an angular slot 18 through which a focusing shaft 19 extends. The inner end of shaft 19 is connected to the tubular viewing member 14 such that the positioning of the knob 17 along the inclined slot 18 positions the tube member within the holder and, thereby, provides axial positioning of the viewing member 14 with respect to the transparency.

In operation, the slide 3 is inserted in the normal viewing position; that is, in an upright position as originally photographed. This is true because the present viewer does not invert the image or reverse it from left to right and vice versa. The slide 3 is depressed downwardly to close the switch 5 and turn on the lamp 11. With the slide viewer 1 held up to the eye, the focus knob 17 is adjusted until the image is in sharp focus.

Although the illustrated embodiment of the invention is shown with a single lens 16, a more complicated lens structure can, of course, be employed and may, of course, provide for color correction or the like. However, with any construction it is important that the lens be constructed to produce appreciable pincushion distortion effect, which is normally considered undesirable and purposely minimized. Thus, the present invention relies directly on the pincushion distortion of a lens means such as that obtained with a spherical lens.

Although shown applied to a transparency viewer unit, the invention can readily be applied to a conventional opaque print projector wherein the transmitted light is established as a reflected light. Further it can be applied directly to any projector by employing a curved screen to receive the pincushion distorted image.

Figure 4:
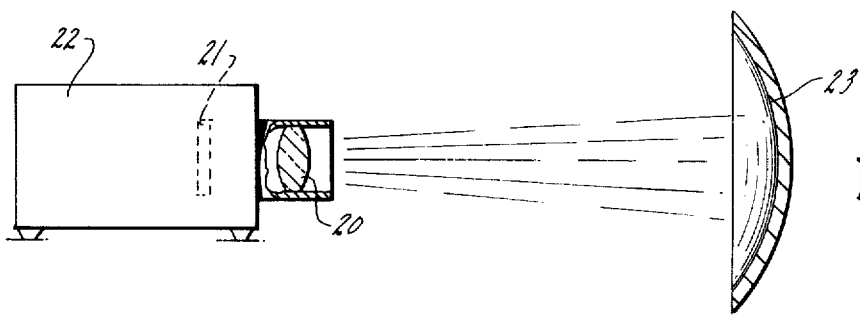
FIG. 4 is a diagrammatic view of the invention for projection upon a viewing screen.

For example, as diagrammatically shown in FIG. 4, a lens 20 is placed accurately at the focal distance with respect to the image film 21 in a projection 22. The image is projected upon a curved screen 23 which is essentially a portion of a sphere. The screen may be distorted slightly from a spherical configuration, such as a parabolic configuration or the like. The lens 20 is again specially provided to produce pincushion distortion which is related to a spherical configuration and the curved screen 23 cooperates therewith to maintain the desired three-dimensional presentation.

The present invention thus provides a simple, reliable, and inexpensive means for converting of the conventional object into a three-dimensional presentation.

Various modes of carrying out the invention are contemplated as being within the scope of the following claims, particularly pointing out and distinctly claiming the subject matter which is regarded as the invention:

I claim:

1. An apparatus for viewing a three-dimensional effect image of a single-dimensional substantially planar object, comprising an object carrier means, a lens means constructed for creating a pin cushion distorted image, the lens means mounted and spaced relative to said object carrier and having the axis of the lens means generally perpendicular to the plane of the planar object, and means for illuminating the object to establish corresponding presentation of the planar object through said lens as an image with appreciable pin cushion distortion.

2. An apparatus for viewing a three-dimensional effect image of a single-dimensional substantially planar object, comprising lens means constructed for creating a pin cushion distorted image, an object support means, means mounting said lens and object support means for positioning the axis of the lens generally perpendicular to the plane of the planar object and spaced from one side of the lens an amount substantially equal to the focal length of the lens, the mounting means further defining a viewing end spaced from the opposite side of the lens an amount which is less than the focal length of the lens.

3. The viewing apparatus of claim 2 in which the object support means includes a transparency slide support, and further including an eye piece including the lens means, and adjustable mounting means for the eye piece for moving the eye piece in relation to the transparency slide support and focusing the image.

4. The viewing apparatus of claim 2 in which the object illumination means includes a curved illuminator.

5. The apparatus of claim 2 wherein said lens is a single, spherical lens creating said pin cushion distortion.

6. A viewing apparatus for projection of an image of a single dimension film and of the type having a film projector with illumination means, and film support means a, wherein the improvement comprises a lens means constructed for creating a pin cushion distorted image, and a curved, generally spherical viewing screen to receive the image and to cooperate with said pin cushion distorted image to define a three-dimensional presentation of the image.

* * * * *